May 9, 1967 J. AVINS 3,319,004

TUNING INDICATOR SYSTEM FOR MULTIPLEX RADIO RECEIVERS

Filed July 30, 1962

INVENTOR.

JACK AVINS

BY Eugene M. Whitacre

Attorney 3,319,004

TUNING INDICATOR SYSTEM FOR MULTIPLEX RADIO RECEIVERS

Jack Avins, New York, N.Y., assignor to Radio Corporation of America, a corporation of Delaware Filed July 30, 1962, Ser. No. 213,494
12 Claims. (Cl. 179—15)

The present invention relates to compatible stereophonic multiplex radio receivers which operate in response to both monophonic and stereophonic signal information on a single modulated carrier wave, and more particularly to visual tuning indicator systems therefor.

Under present broadcasting regulations, the carrier wave is frequency modulated by the sum of two modulating audio-frequency signals, such as two stereophonically-related left and right or (L) or (R) signals, as a single modulating signal in the usual manner for FM broadcast and monophonic reception by compatible stereophonic multiplex FM receivers and existing monophonic FM receivers.

In the multiplex system, the carrier wave further is simultaneously provided with stereophonic information effective for signal separation, in the form of a suppressed-carrier subcarrier signal which is amplitude-modulated with the difference of the two stereophonically-related signals to be transmitted, and a pilot-signal for use in demodulating the suppressed-carrier signal.

The frequency-modulation detector output of the multiplex receiver is thus composed of the main frequency-modulation signal component, which is the compatible (L+R) signal used by a non-modified or monophonic frequency-modulation receiver as well as the multiplex receiver, a 19 kc. pilot signal, and the stereophonic information or difference-frequency (L—R), signal that is an AM double-side-band supressed-carrier signal presently at 38 kc.

In one form of existing stereophonic signal receivers of the multiplex type, the compatible composite stereophonic signal at the multiplex output circuit of the frequency-modulation detector, as above referred to, is applied to stereophonic multiplex circuitry which operates to separate the subcarrier information through suitable high-pass or band-pass filter means, after which the stereophonic information or (L—R) difference component is demodulated, as by a synchronous subcarrier detector in which the (L—R) side-bands are added to a subcarrier signal derived from or controlled by the pilot signal.

By suitable matrix circuitry which follows the subcarrier detector, the demodulated subcarrier signal (L—R), at audio-frequency, is subtracted from and added to the sum signal (L+R) audio-frequency component to derive the separate stereophonically-related, or L and R, audio-frequency or sound signals which are then applied to the two separate stereophonic signal output channels of the receiver. These channels include the separate audio-frequency channel amplifiers and individual channel output sound-reproducing or loud-speaker means.

In multiplex radio receivers, such as the present (FM) frequency-modulation type, the subcarrier or (L—R) stereo-information channel is generally automatically disabled when a frequency-modulation station, to which the receiver is tuned, is not transmitting a pilot signal and broadcasts monophonic or single-channel FM program material. This is for the reason that, in the absence of a pilot signal, and without such disabling, high-pass or band-pass filter means in the subcarrier channel may provide a path for any signals of subcarrier frequency to come through the subcarrier detector. Ignition, impulse and thermal noise signals thus may pass through the band-pass filter for the subcarrier side-bands.

The multiplex circuitry may include an oscillator operable at the pilot-signal frequency or a multiple thereof, and which is biased off during monophonic reception. When a stereophonic signal is received, the pilot tone or signal is separated and may be applied to a full-wave rectifier which develops a voltage to turn on the oscillator, which reopens the channel, and by frequency doubling operates to apply the subcarrier signal to the subcarrier detector as above referred to.

In connection with frequency-modulation multiplex radio receivers, it has been found desirable for commercial reasons to provide means for indicating when a stereophonic signal is being received. Heretofore, it has been suggested that an indicating system be provided in which a panel lamp is energized through a control tube or relay responsive to or actuated by the 19 kc. pilot tone or signal. This indicating system is in addition to the usual FM tuning indicator system which provides for centering the tuning to each received signal for best sound output from the receiver as is known. Therefore, in present commercial frequency-modulation multiplex radio receivers adapted for both monophonic and stereophonic signal reception, the usual visual tuning indicator system is provided, along with a stereophonic signal indicator system, each employing separate indicator means.

In providing tuning indicator means for (FM) frequency-modulation signal reception, various devices such as "tuning-eye" or indicator tubes of the cathode-ray or electron-beam type with fluorescent screen or display means are presently used in connection with suitable signal-responsive control circuits. These tubes operate generally to provide a darkened area of varying width in a luminescent or fluorescent screen, the tuning adjustment being such that the width of the area on the screen display is minimum for proper tuning. Receivers of this type provide for viewing such tuning aids at the receiver control panel which may also include a translucent jewel or bead illuminated by the indicator lamp responsive to stereophonic signals as above described. The tuning and stereo signal indicating systems involve separate circuits and circuit elements and thus tend to complicate the receiver.

It is, therefore, an object of this invention, to provide a simple and effective tuning indicator system for multiplex radio receivers which also indicates whether a stereophonic signal is being received.

It is also an object of this invention to provide a combined tuning and stereophonic indicator system for multiplex radio receivers which is of simplified construction involving common circuits and circuit elements.

It is a further object of this invention to provide a combined tuning and stereophonic signal indicating system, for stereophonic multiplex radio receivers, in which the stereophonic signal indication is independent of the tuning indication and signal strength.

It is also a further object of this invention, to provide an improved tuning indicator system for stereophonic multiplex FM radio receivers which is effective for monophonic and stereophonic operation and which additionally provides stereophonic signal indication automatically.

It is a still further object of this invention to provide a combined tuning and stereophonic signal indicator system for frequency-modulation multiplex radio receivers in which a single beam-deflection or electroluminescent type of tuning-indicator tube may be utilized for both stereophonic signal and tuning indication, thereby to simplify the receiver circuitry, construction and operation.

In accordance with one form of the invention, an electroluminescent display device, such as a tube providing a fluorescent screen pattern or display for tuning indication in response to received signals, is further controlled to modulate or shade the screen pattern or display for stereophonic signal indication. In this form of the invention, the control signal applied to the tuning indicator tube is derived from the multiplex circuitry of the receiver and comprises a signal at the pilot-signal frequency, or a multiple thereof such as the subcarrier suppressed-carrier signal in the present system of FM stereo-multiplex broadcasting. The tuning indicator control potential or voltage is a variable signal-responsive bias voltage derived from the (AGC) automatic gain-control system or other suitable source of signal-responsive bias voltage, such as the limiter stage of the frequency-modulation multiplex receiver.

The combined tuning and stereo-indicating system of the present invention thus operates to modulate the display or screen pattern, or change the luminescent pattern geometry or luminous display, on the viewing area or screen of a tuning indicator tube or like electroluminescent display device. Specifically, in accordance with one form of the invention, the target voltage of a beam-deflection type tuning indicator tube is modulated or varied from a normal fixed operating level at a rate which may be based upon the pilot signal or subcarrier frequency. This effectively modulates the deflection sensitivity and shades the screen pattern along one or more edges.

In operation, the stereophonic indication is thus essentially independent of the tuning indication and the signal strength, since the modulating signal is derived from the multiplex circuitry and is responsive to the reception of stereophonic information. The usual complicating relay, signal lamp and circuitry are thus eliminated. By this system, the single tuning indicator device functions for stereophonic signal indication without the addition of appreciable cost or circuit complication in the receiver with which it is used.

The invention will be further understood from the following description, when considered in connection with the accompanying drawing, and its scope is pointed out in the appended claims.

Figures 1, 2, 3, 4, 5:
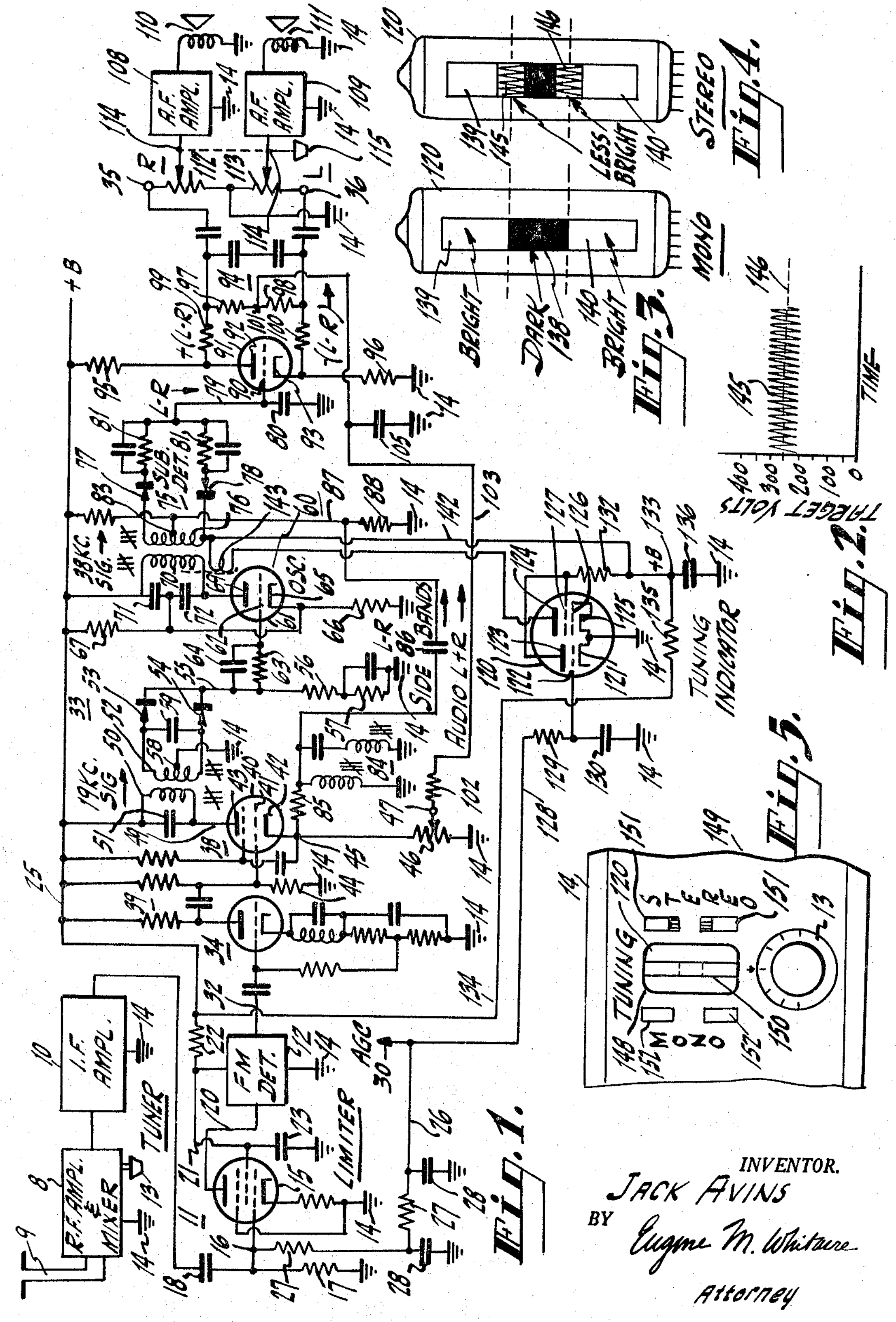
FIGURE 1 is a schematic circuit diagram of a frequency-modulation multiplex radio receiver provided with a combined tuning and stereophonic indicator system embodying the invention.
FIGURE 2 is a graph showing a curve indicating a control signal characteristic for a tuning indicator element of the circuit of FIGURE 1.
FIGURES 3 and 4 are schematic views, in elevation, of a tuning indicator element used in the circuit of FIGURE 1, showing the display function thereof under two different conditions of operation of the receiver.
FIGURE 5 is a fragmentary view, in elevation, of the front panel of the radio receiver of FIGURE 1 showing tuning indicator means and tuning elements of the receiver.

Referring to the drawing, in which like reference characters are used to designate like elements throughout the various figures, and referring more particularly to FIGURE 1, the frequency-modulation multiplex radio receiver of the present example is provided with the usual radio-frequency amplifier and mixer 8 tunable through the frequency-modulation band of 88 to 108 mc. as presently assigned for broadcasting. This is coupled to the antenna means 9 and the usual I.-F. amplifier 10 which is followed by a limiter stage 11 and a suitable frequency-modulation detector 12. The R.-F. amplifier 8 is provided with tuning means indicated by the tuning control element or knob 13. Common circuit return or chassis ground connections 14 for the receiver circuits are indicated throughout the circuit diagram.

The limiter stage 11, preceding the FM detector 12, may be of any suitable type such as that shown, comprising an electronic limiter tube 15 having a signal-input grid circuit 16 connected to common ground 14 through a grid resistor 17 and coupled to the I.-F. amplifier as by an input coupling capacitor 18. The output anode circuit 20 of the limiter is coupled to the FM detector 12 and connected therethrough with a positive anode or operating current supply circuit lead 21. The latter is connected through a suitable filter, comprising the series resistor 22 and the shunt filter capacitor 23, with the system +B supply lead 25 which it is maintained at a predetermined fixed positive operating potential with respect to chassis ground means 14, as is understood.

The limiter stage 11, here used as a source of AGC (automatic-gain-control) voltage, is provided with an output AGC connection or circuit lead 26 from the grid 16 through low-pass filter means comprising a series resistor 27 and a shunt by-pass capacitor 28. An AGC connection lead for the R.-F. and I.-F. amplifiers 8 and 10 is indicated at 30 in connection with the lead 26 from the limiter 11. As is understood, in response to received signals tuned in through the R.-F. amplifier and mixer 8, the limiter grid voltage increases negatively with respect to ground, thereby applying a gain-controlling voltage to the amplifiers connected to the AGC lead 30 for maintaining a constant sound or signal output from the receiver with varying signal level or amplitude in the received carrier-wave. This signal-responsive control voltage is further utilized for tuning and stereo signal indication as will hereinafter be described.

The receiver circuits shown are representative of any stereophonic multiplex receiver of the type herein referred to. The multiplex output circuit of the FM detector 12 includes a circuit output lead 32 and ground 14, and is coupled to the stereophonic multiplex circuit 33 of the receiver through an input amplifier stage 34. The multiplex circuit also provides means for deriving the stereophonically-related (L and R) or like modulation component signals from the composite signal at the FM detector output circuit, and provides at its output terminals, indicated at 35 and 36, the separated modulation component signals, such as the L and R stereo signals in the present example.

In the stereophonic multiplex circuit 33, a signal-separating amplifier stage 38 is provided and coupled to the input stage 34 by suitable resistance-capacitance coupling means 39. The amplifier stage 38 includes an amplifier tube 40 having a signal input grid 41, a cathode 42 and an output anode 43. The input grid is connected with the coupling means 39 across an input grid resistor 44, also connected to ground 14. The cathode is provided with a signal output terminal 45 which is connected to system ground through a signal output coupling resistor 46 having a movable output contact 47. This stage may be coupled to receive input signals directly from the FM detector if desired, as the amplifier stage 34 is used in the present example for frequency compensation which does not concern the present invention.

The anode circuit 49 of the signal-separation amplifier tube 40 is tuned to the pilot signal, which is 19 kc. in the present example, by a tunable coupling winding 50 and a shunt tuning capacitor 51 therefor. The winding 50 is inductively coupled to and operates as a primary winding for a center-tapped secondary winding 52 which is connected at its ends with two parallel diode rectifiers 53 and 54 at the anode sides thereof, while the cathodes are connected in parallel with an output circuit lead 55 and two series-connected rectifier output resistors 56 and 57 to ground 14. The resistor 57 is bypassed for 38 kc. signals. The return circuit from the output resistors 56 and 57 is through ground to the center tap 58 on the winding 52.

The winding 52 is provided with a shunt tuning capacitor 59 and is adjusted for response to the pilot-signal frequency of 19 kc. which is frequency doubled in the full-wave rectifier circuit thus provided. This is for the reason that since the output resistor element 56 is unbypassed, a voltage pulse is produced thereacross at the 38 kc. rate, or two pulses for each cycle of the 19 kc. pilot tone or signal.

The oscillator or signal generator stage 60 comprises a triode tube 61 having an input grid 62 connected through a series isolating resistor 63 with the output lead 55 for the rectifier. The resistor 63 is provided with a suitable shunt 38 kc. bypass capacitor 64. The cathode 65 of the oscillator tube 61 is connected to ground through a cathode resistor 66 which supplied with bleeder current from the positive supply lead 25 through a series-connected resistor 67, thereby to apply a cut-off bias to the control grid 62 in the absence of a pilot-signal and rectifier output from the rectifier circuit. When the 19 kc. pilot-signal is received, the output voltage from the rectifier circuit applies a positive-going bias to the grid circuit of the tube 61 thereby overcoming the cut-off bias and turning on the oscillator.

The anode 69 of the oscillator tube 61 is connected to the supply lead 25 through a parallel-resonant tank circuit tuned to the suppressed-carrier frequency of 38 kc., which is twice the frequency of the pilot-signal. The parallel-resonant circuit includes a tunable inductor 70 across which a pair of series capacitors 71 and 72 are connected. The junction of the capacitors is connected to the cathode 54, thereby to sustain oscillation when the oscillator tube 61 is released from cut-off in response to the 19 kc. pilot signal.

Thus, during monophonic reception, the oscillator does not operate because of the positive voltage applied to the cathode 65 thereof. When the positive control voltage from the full-wave rectifier, frequency-doubler, circuit at the grid 62 exceeds the threshold voltage at the cathode 65 as set by the voltage divider means 66–67, the circuit oscillates and is locked in frequency and phase at the 38 kc. pulse rate applied to the grid 62. The capacitor 64 provides a low impedance path for the 38 kc. synchronizing pulses, and the grid resistor 63 provides isolation between the negative voltage which tends to build up at the grid when the tube 61 oscillates, and the positive voltage which develops across the rectifier output resistors 56 and 57.

Thus, when the pilot signal is received, the direct control voltage appearing across the resistors 56 and 57 permits the oscillator circuit to begin oscillation locked in frequency and phase to the 38 kc. ripple component produced by the full-wave rectification of the pilot signal. The oscillator signal output or subcarrier signal necessary for demodulating the subcarrier sidebands is thus produced only when a stereophonic signal is received. It also provides a source of automatic stereophonic and monophonic control signals for tuning indicator means in the receiver system as will be seen.

The 38 kc. subcarrier signal output voltage from the oscillator circuit 60 is applied to a balanced synchronous peak detector circuit 75 which is operative to drive the (L−R) signal component from the subcarrier signal sidebands. The subcarrier detector circuit includes a center-tapped tunable winding 76 inductively coupled to the oscillator tank circuit inductor 70 as indicated, and a pair of diode rectifiers 77 and 78 connected with the ends of the winding 76. These provide signal rectification and signal output of the demodulated (L−R) signal component at an output circuit lead 79 which is connected through a shunt output capacitor 80 to ground.

The subcarrier detector circuit 75 may be of any suitable type, and in the present example further includes two by-passed output resistors 81 connected between the rectifier and the output circuit lead 79 as indicated. This provides a balanced peak detector circuit from which the signal output is the detected modulation of the suppressed subcarrier, which modulation in this case is the desired stereo signal information or the (L−R) signal component. This detector circuit thus receives the 38 kc. carrier signal from the oscillator through the coupling above described, and the subcarrier sidebands necessary for detection are applied to the detector circuit at the center-tap 83 on the input winding 76.

To select the subcarrier sidebands, a combined filter and deemphasis network 84 is used to couple the cathode terminal 45 of the signal separation amplifier 40 with the center-tap 83 on the subcarrier detector circuit 75. This connection is completed through a series decoupling resistor 85, a series coupling capacitor 86 and a circuit lead 87. A bias supply resistor 88 is connected with the lead 87 between the center-tap 83 and system ground to provide an operating bias for the output circuit 79–14 as will hereinafter appear.

It will be noted that the composite demodulated FM signal including the (L+R), 19 kc. pilot signal, and the subcarrier wave (L−R) sidebands appear at the cathode terminal 45 of the signal-separating signal amplifier stage 38, having been linearly amplified in the amplifier stage as received from the FM detector through the coupling amplifier stage 34. The signal separation amplifier circuit 38 operates to develop the 19 kc. pilot signal in the tuned anode circuit 49 for application to the frequency-doubler and oscillator, while the composite signal is developed in the cathode circuit at the terminal 45.

Of this composite signal, the filter network 84 serves to pass only the subcarrier (L−R) sidebands through the circuit connection 87 to the center-tap 83 on the subcarrier detector circuit 75 where the sidebands are applied to the full 38 kc. carrier delivered from the oscillator circuit 60. Thus the 38 kc. oscillator output voltage and subcarrier sidebands are applied to the balanced synchronous detector 75 to drive the original (L−R) signal information.

The demodulated subcarrier sideband signal (L−R) is developed in the output circuit 79–14 across the output capacitor 80 and are applied to the control grid 90 of a triode phase-splitter or inverter tube 91. The tube includes an anode 92 and a cathode 93 which are connected through load impedance or coupling elements 95 and 96, respectively, to the operating potential supply source 25 and ground for the system.

A stereo matrix circuit or network 94 is provided and includes a pair of series-connected resistors 97 and 98 which are coupled to receive opposite phases of the stereo information (L−R) signal from the phase inverter stage 91. One end of the output resistor 97 is coupled to the anode 92 through an isolating resistor 99 to receive the + (L−R) signal component and one end of the output coupling resistor 98 is similarly coupled to the cathode 91 through a similar isolating resistor 100 to receive the − (L−R) signal component. The (L+R) signal component is derived from the cathode terminal 45 of the signal-separation amplifier stage 38 and is applied to the matrix network, at the junction or mid terminal 101 of the output resistors 97 and 98, through a circuit connection lead 102 between the contact 47 and that junction or terminal. High-frequency signal components, and the pilot signal and subcarrier sidebands present at the cathode terminal 45, are effectively removed in this circuit connection by high-frequency deemphasis means including a series filter resistor 103 and shunt capacitor 104 to ground, as indicated.

Thus the audio-frequency (L+R) signal component is applied to the terminal 101 of the matrix circuit and adds to the + (L−R) and − (L−R) signal components to produce the right and the left (L and R) stereophonic signal components at the terminals 35 and 36 respectively. Adjustment of the contact 47 on the output resistor 46 provides the proper amount or amplitude of the (L+R) signal component at the matrix circuit for the addition and subtraction of the signal components to produce the proper signal output at the terminals 35 and 36.

The receiver system further includes suitable audio-frequency channel amplifiers 108 and 109 connected to drive channel sound-reproducing or loudspeaker devices 110 and 111, respectively, in response to signals applied thereto from the channel output circuits at the terminals 35 and 36. For controlling the volume or output sound level, suitable volume control means comprising potentiometer resistors 112 and 113 are connected respectively between the terminals 35 and 36, and ground for the system. The variable output volume-control contacts 114 for the resistors 112 and 113 are ganged, as indicated, for joint operation by suitable manual control means represented by a control knob 115, and are connected to the respective channel amplifiers 108 and 109. The dual-channel signal-translating circuit and sound-reproducing output means therefor is representative of any suitable means of this type normally provided in a stereophonic sound-reproducing system. In connection with the receiver circuits provided, as described, to supply effective control signals and voltages, simple and effective tuning indication may be achieved which includes automatic indication when a stereophonic signal is being received. Furthermore, the present system for this purpose may conveniently utilize indicating devices heretofore proposed for tuning indication alone in one mode which are further adapted for modulation to vary the indicator pattern or visual signal output thereof in a second mode in response to other signals on or derived from the carrier-wave for stereophonic operation.

Thus a tuning indicator tube 120 of the cathode-ray or electron-beam type is provided herein by way of example in connection with suitable signal-responsive control circuits provided in the receiver system as above referred to. A tuning indicator tube of the type indicated, and suitable for use in accordance with the invention, is a commercial type 6FG6, enclosing triode amplifier elements along with tuning indicator elements. The triode portion comprises the cathode 121, an input signal grid 122 and an output anode 123. The tuning indicator portion includes a target electrode 124, a cathode-ray beam source of cathode 125, a suppresser type grid 126 connected to the cathode, and a beam deflection or control electrode 127. The cathodes 121 and 125 are connected to signal ground while the triode input grid 122 is connected to a signal-responsive control-voltage source as provided by the AGC output lead 26, this connection being made through a connection lead 128 and a series filter resistor 129 for which a by-pass capacitor 130 is provided to ground at the grid. The control or beam deflection electrode 127 of the indicator portion of the tube is coupled to the output anode 123 across a series anode circuit resistor 132 which is connected to a positive power voltage supply terminal 133. The latter is connected to the positive operating current supply source at the lead 25 through a supply circuit lead 134 and low-pass filter means therein comprising a filter resistor 135 and a shunt by-pass filter capacitor 136 to ground from the terminal 133. The positive operating potential at the terminal 133 is therefore filtered and steady for maintaining constant operating voltage on the indicator tube.

It will be seen that with this circuit, as the AGC voltage varies in response to variations in a received signal or in response to a signal tuned in, the anode current of the triode will vary through the load resistor 132 thereby varying the control voltage on the deflection or control electrode 127. This in turn varies the electron beam to provide a darkened area of varying width on the luminescent screen or viewing area, as indicated in the physical representation of the tube 120 in FIGURES 3 and 4, to which attention is directed along with the preceding figure.

As indicated more specifically in FIGURE 3, as the negative bias voltage from the AGC circuit increases on the control grid 122 due to tuning in a signal to be received, the anode current is reduced thereby increasing the potential on the deflection electrode 127 in a positive direction and decreasing the width of a central dark area 138 in the luminescent pattern of the screen of the tube, which is thus divided into two luminescent or bright areas 139 and 140 on either side thereof. To supply beam current to the target electrode 124, the latter is connected through a circuit lead 142 with the positive terminal 133 as indicated. A coupling winding 143 is interposed serially in the target electrode supply circuit and is inductively coupled to the oscillator tank circuit inductor 70 as indicated. The screen portion of the indicator tube thus presents brightened areas divided by the darkened area of varying width as the signal strength varies in tuning, the tuning control being operated to bring the darkened area to a minimum width which occurs as the control electrode 127 becomes more positive as above and described. To provide stereophonic signal indication which is independent of the tuning indication and the signal strength, the target 124 voltage is modulated by a pilot or other stereophonic-signal responsive voltage such as that indicated by the voltage wave 145 about an average or a fixed value indicated by the dash line 146 of FIGURE 2. This is approximately 250 volts as the D.-C. target voltage with a tube of the type referred to. In the present example, the wave 145 varies at the 38 kc. signal rate, being derived by the coupling with the oscillator tank circuit through the pickup coil 143 in the target electrode circuit 142 as above described.

The oscillator or carrier signal thus modulates the D.-C. target potential or operating voltage of the tube, and the reseult is to vary the control effect of the beam deflection electrode 127 which causes a variation in the inner edge of each of the screen patterns 139 and 140 as the darkened area 138 is effectively modulated or varied in width. Referring more particularly to FIGURE 4, this results in what appears to be two less bright edge areas 145 and 146 for the areas 139 and 140 respectively, thereby indicating that a stereophonic or two-channel signal is being received.

The stereophonic or like control signal may, however, be obtained from any portion of the receiver, where a control signal is available that is not available during monophonic reception. In the present receiver such signal is derived from the subcarrier signal channel following the stereo signal separator stage 38, at the oscillator output circuit, although the 19 kc. signal can be used as well if sufficiently strong. The oscillator signal is chosen because it is of fixed strength or amplitude, and either off or on, regardless of signal strength variations. The oscillator circuit 60 is thus inoperative or automatically disabled when the oscillator is cut off, during monophonic operation, by the absence of the pilot tone or signal.

In connection with the oscillator or subcarrier channel, therefore, means are provided for deriving a control signal for modulating the operating potential of one control electrode of the tuning indicator device. Thus the stereophonic signal indication depends upon the presence of the pilot or subcarrier signal, and in the circuit described is independent of the signal strength variations and the tuning indication.

Referring to FIGURE 5, an operating panel arrangement is shown wherein the tuning indicator tube 120 is aligned vertically in rear of a viewing window 148 in the operating panel 149 on which is also located the tuning knob or control element 13. The latter is positioned conveniently below the tuning indicator tube and window and the unmodulated screen pattern of the deenergized tube is indicated thereon at 150, to the right of the window 148 and on the panel surface are embossed or imprinted representations 151 of the desired tuning indication for stereo response with the modulated edges of the screen patterns clearly shown to assist the operator of the receiver. On the opposite side of the window the stereophonic tuning indicator patterns 152 are likewise provided for reference in tuning the monophonic signals. Other suitable panel arrangements may be provided for this purpose.

The combined tuning and stereo indicating system of the present invention thus operates to modulate the display or screen pattern or to change the luminescent pattern geometry or luminescent display on the viewing area or screen of a tuning indicator tube or like electroluminescent display device, as hereinbefore pointed out, and its accuracy is independent of the tuning indication and the signal strength. This system has the further advantage that a single beam-deflection or fluorescent-screen type of tuning indicator tube, as presently available on the commercial market, may be utilized for both stereophonic signal and tuning indication and thereby further simplify the receiver circuitry, construction and operation.

What is claimed is:

1. In a stereophonic multiplex radio receiver, the combination of:
visual tuning indicator means for providing indications in response to reception of either monophonic or stereophonic signals of proper tuning to obtain maximum received signal strength, and
means of modifying the operation of said indicator means in response to stereophonic signal information including a pilot signal on a received carrier wave to indicate the presence of said pilot signal and thereby indicate the presence of said stereophonic information.

2. In a stereophonic multiplex radio receiver, the combination of:
visual tuning indicator means responsive to either monophonic or stereophonic signals for providing indications of proper tuning through control voltage variation,
means for applying a fixed operating voltage to said indicator means, and
means for modulating said last named voltage in response to stereophonic signal information including a pilot signal on a received carrier wave to provide additional visual indication of the presence of said pilot signal and thereby indicate the presence of said stereophonic signal information.

3. An indicator system for use in a frequency modulation receiver adapted for the reception of a carrier frequency modulated by an audio sum signal, a suppressed carrier signal modulated by an audio difference signal and an alternating current pilot signal harmonically related to said suppressed carrier, comprising means producing a first direct voltage representative of the amplitude of the received frequency modulated carrier, means producing a second voltage in response to the presence of said pilot signal and composite indicator means simultaneously indicating the amplitude of said first direct voltage and the presence of said second voltage.

4. In a stereophonic multiplex radio receiver, the combination of:
tuning indicator means including an electron-beam luminescent-display tube having a visible luminous screen pattern variable for tuning indication in response to either received monophonic or to combined monophonic and stereophonic signals on a single carrier wave,
means for applying an operating voltage to said tube to establish said screen pattern, and
means for modulating said operating voltage at a predetermined frequency for changing said screen pattern in response to an additional pilot signal representative of the presence of stereophonic information on said carrier wave.

5. In a stereophonic multiplex radio receiver, the combination of:
a visual tuning indicator tube of the electron-beam fluorescent-screen type having a control electrode and a second electrode,
means providing a received-signal-amplitude-responsive control voltage coupled to the control electrode of said tube for changing the screen pattern thereof as an indication of proper tuning to obtain maximum received signal strength for monophonic or stereophonic signals, and
means providing a stereophonically-controlled source of oscillations at a predetermined frequency coupled to said second electrode of said tube for modulating the deflection sensitivity and screen pattern thereof as a stereophonic signal indication in response to received signals.

6. In a stereophonic multiplex radio receiver, the combination of:
visual tuning indicator means of the electron-beam fluorescent-screen type having a control electrode connected for operation in response to either monophonic or stereophonic signals to provide a darkened area of variable width in the screen pattern thereof to provide an indication of proper tuning for receiving maximum signal strength,
means for applying a fixed operating potential to said indicator means to establish said screen pattern, and
means for modulating said operating potential in response to stereophonic signal information including a pilot signal on a received carrier wave to vary the screen pattern at the edges of said darkened area and visually indicate the presence of said pilot signal and thereby indicate the presence of said stereophonic signal information.

7. In a stereophonic multiplex radio receiver, the combination as defined in claim 6, wherein the means for modulating the operating potential includes an oscillator connected for response to a pilot signal on a received carrier wave and coupled to said means for applying the fixed operating potential to said indicator means to modulate said operating potential at a multiple of the pilot signal frequency, thereby to vary said screen pattern.

8. In a stereophonic multiplex radio receiver, the combination of:
visual tuning indicator means of the cathode-ray fluorescent-screen type having a control grid and a target electrode providing a screen pattern that varies with control grid voltage,
means responsive to either monophonic or stereophonic received signals for applying received signal strength indicating control voltage to said control grid,
means for applying a fixed operating voltage to said target electrode to establish said screen pattern, and
means for modulating said operating voltage in response to stereophonic signal information including a pilot signal on a received carrier wave to further vary said screen pattern and provide simultaneous visual indication of proper tuning to obtain maximum received signal strength and of the presence of said pilot signal and thereby indicate the presence of said stereophonic signal information.

9. In a stereophonic multiplex radio receiver, the combination of:
tuning indicator means including an electron-beam luminescent-display tube having target electrode operative to establish a visible luminous screen pattern,
means including a control electrode and a signal-responsive control voltage source therefor for varying said screen pattern in two opposed areas for tuning indication in response to received monophonic and stereophonic signals on a single carrier wave,
means for applying an operating voltage to said tube to establish said screen pattern, and
means for modulating the opposed edges of the luminous areas of said screen pattern in response to an additional signal on said carrier wave,
said last-named means including a subcarrier signal oscillator connected for response to a received pilot signal on said carrier wave and coupled to apply a modulating output voltage to said target electrode.

10. In a stereophonic multiplex radio receiver, the combination of:
a visual tuning indicator means of the electron-beam fluorescent-screen type having a control electrode and a second electrode, means providing a signal-amplitude-responsive control voltage coupled to the control electrode for changing the screen pattern thereof as a signal tuning indication for monophonic and stereophonic signals, means providing a source of oscillations at a predetermined stereophonic signal frequency coupled to said second electrode for modulating the screen pattern of said indicator means as a stereophonic signal indication in response to received signals including a pilot tone, and means for cutting off said oscillations in the absence of said pilot tone.

11. In a stereophonic multiplex radio receiver, the combination as defined in claim 10, wherein the second electrode of said indicator means is provided with a fixed direct-current operating voltage for establishing a fixed screen pattern, and wherein said source of oscillations operates at the multiplex subcarrier frequency to modulate said direct-current operating voltage in response to said pilot tone, thereby to modulate said screen pattern effectively in brightness in predetermined areas at said frequency.

12. In a stereophonic multiplex radio receiver, the combination of:

a visual tuning indicator tube of the electron-beam fluorescent-screen type having two electrodal control elements and a fluorescent-screen pattern controlled thereby, means providing a signal-amplitude-responsive control voltage coupled to one control element of said tube for changing the screen pattern thereof in two opposed areas as a signal tuning indication for monophonic and stereophonic signals, means providing a controlled source of oscillations at a subcarrier signal frequency coupled to the other of said control elements for modulating the deflection sensitivity of said tube and shading the screen pattern thereof along the opposed edges of said edges of said areas as a stereophonic signal indication, and means responsive to a predetermined pilot signal on a received carrier wave for controlling said source of oscillations.

References Cited by the Examiner

UNITED STATES PATENTS

| | | | |
|---|---|---|---|
| 2,175,700 | 10/1939 | Roberts | 334—35 |
| 3,009,151 | 11/1961 | Shoof | 179—15 |
| 3,047,666 | 7/1962 | Crosby | 179—15 |
| 3,105,117 | 9/1963 | Frank | 179—15 |
| 3,242,264 | 3/1966 | De Vries | 179—15 |

FOREIGN PATENTS

| | | |
|---|---|---|
| 1,092,515 | 11/1960 | Germany. |

DAVID G. REDINBAUGH, *Primary Examiner.*

R. L. GRIFFIN, *Assistant Examiner.*